United States Patent
Ranjbar Alvar et al.

(10) Patent No.: US 12,499,187 B2
(45) Date of Patent: Dec. 16, 2025

(54) METHODS AND SYSTEMS FOR WATERMARKING DIGITAL DATA

(71) Applicant: Huawei Cloud Computing Technologies Co., Ltd., Guizhou (CN)

(72) Inventors: Saeed Ranjbar Alvar, Coquitlam (CA); Mohammad Akbari, Coquitlam (CA); Ming Xuan Yue, Richmond (CA); Yong Zhang, Richmond (CA)

(73) Assignee: Huawei Cloud Computing Technologies Co., Ltd., Guian (CN)

( * ) Notice: Subject to any disclaimer, the term of this patent is extended or adjusted under 35 U.S.C. 154(b) by 112 days.

(21) Appl. No.: 18/450,092

(22) Filed: Aug. 15, 2023

(65) Prior Publication Data
US 2025/0062911 A1   Feb. 20, 2025

(51) Int. Cl.
*G06F 21/16* (2013.01)
*G06T 1/00* (2006.01)
*H04L 9/32* (2006.01)
*H04N 21/2389* (2011.01)
*H04N 21/8358* (2011.01)

(52) U.S. Cl.
CPC ............ *G06F 21/16* (2013.01); *G06T 1/0071* (2013.01); *H04L 9/3247* (2013.01); *H04N 21/23892* (2013.01); *H04N 21/8358* (2013.01); *G06T 2201/0062* (2013.01); *H04L 2209/608* (2013.01)

(58) Field of Classification Search
None
See application file for complete search history.

(56) References Cited

U.S. PATENT DOCUMENTS

| | | | |
|---|---|---|---|
| 6,449,380 B1* | 9/2002 | Acharya | H04N 1/32277 382/235 |
| 9,911,171 B2 | 3/2018 | Malik et al. | |
| 11,669,601 B2* | 6/2023 | Jalali | G06F 21/16 726/26 |
| 2003/0118208 A1 | 6/2003 | Epstein | |
| 2003/0204727 A1 | 10/2003 | Sasaki | |
| 2022/0130008 A1* | 4/2022 | Jalali | G06F 21/16 |
| 2024/0087075 A1* | 3/2024 | Luo | G06T 1/0064 |

OTHER PUBLICATIONS

Sablayrolles et al., "Radioactive data: tracing through training", In International Conference on Machine Learning, Nov. 21, 2020, PMLR.

(Continued)

*Primary Examiner* — Boris D Grijalva Lobos
(74) *Attorney, Agent, or Firm* — BCF LLP

(57) ABSTRACT

Systems and methods for watermarking objects of a digital dataset are disclosed. The method includes, at a first moment in time, acquiring a watermark message of a first size and generating a plurality of sub-messages based on the watermark message. The plurality of sub-messages are indicative of encoded portions of the watermark message. Each of the plurality of sub-messages is different from the watermark message and having a second size, the second size being smaller than the first size. The method also includes generating a watermarked object by embedding a given object from the digital dataset with a given one of the plurality of sub-messages, in lieu of the watermark message.

16 Claims, 7 Drawing Sheets

(56) References Cited

OTHER PUBLICATIONS

Wenger et al., "Data Isotopes for Data Provenance in DNNs", arXiv preprint arXiv:2208.13893, Aug. 29, 2022.
Li et al., "Open-sourced dataset protection via backdoor watermarking", NeurIPS 2020 Workshop on Dataset Curation and Security, Nov. 19, 2020.
Lu et al., "A hierarchical protection scheme for intellectual property of semi-open source datasets based on double watermarking", Optik—Intl. J. for Light and Electron Opt., (2022), 269:169931.
Shehab et al., "Watermarking Relational Databases Using Optimization-Based Techniques", IEEE transactions on Knowledge and Data Engineering. Jan. 2008, 20(1), pp. 116-129.
Thanh et al., "Pseudo Zero-watermarking Technique based on non-blind watermarking and VSS.", Multimedia Tools and Applications, Apr. 2, 2022.
Tekgul et al., "On the Effectiveness of Dataset Watermarking in Adversal Settings", in Proceedings of the 2022 ACM on International Workshop on Security and Privacy Analytics, Feb. 25, 2022.
Fernandez et al., "Watermarking Images in Self-Supervised Latent Spaces", Mar. 23, 2022.
Li et al., "Untargeted Backdoor Watermark: Towards Harmless and Stealthy Dataset Copyright Protection", 36th Conference on Neural Information Processing Systems (NeurIPS 2022), Apr. 5, 2023.

\* cited by examiner

METHODS AND SYSTEMS FOR WATERMARKING DIGITAL DATA

FIELD

The present technology relates generally to watermarking; and in particular, to methods and systems for watermarking digital data.

BACKGROUND

A dataset is a collection of data samples. For instance, MNIST dataset includes images of handwritten digits. Datasets are commonly used in data driven applications, in machine leaning, and data sciences. Large scale datasets have contributed significantly to advances in the field of artificial intelligence. Artificial Intelligence may be employed to solve a variety of tasks because of high-quality large-scale datasets.

In addition, creating a dataset and cleaning the dataset such that it can be used in related tasks is a time consuming and costly process. Therefore, dataset owners expect compensations when the buyers (data consumers) use their datasets. In recent years, a few data marketplaces such as AWS data exchange and Snowflake marketplace are emerged. These platforms enable dataset owners to sell their datasets. In addition, data consumers can browse these marketplaces and buy their required datasets.

Digital watermarking is a computer-implemented technique used to protect the owners and/or operators of a dataset against false ownership claims and/or illegal redistribution. Broadly, watermarking algorithms are used to embed a "hidden message" in a digital file. The hidden message can later be extracted to assert ownership. This watermarking message can be considered as a digital signature that is embedded into a file to identify the owner of the digital asset. If the embedded message includes a message that represents both owner and the consumer, then it can be used to identify both owner and the consumer of the data.

The watermarking message is generally difficult to detect by the consumer and can be used to track unauthorized copies of data. Watermarking techniques are chosen according to data categories. For example, audios, images, and videos can be watermarked by embedding the information into the frequency components which can reduce distortion of the quality of the data.

Some known dataset watermarking methods employ radioactive data, data isotopes, Backdoor Watermarking, and/or Untargeted Backdoor Watermarking. In these methods, the goal is to find whether a particular dataset has been used to train a model. These methods embed some information into data samples in the dataset such that the embedded information can change the behavior of the trained model on the watermarked data. Later, the trained model's output is compared using unwatermarked and watermarked data to decide if the watermarked dataset is used in the training of the trained machine learning model.

Some known dataset watermarking methods employ hierarchical protection. In this dataset watermarking method, watermark messages are embedded into data samples in the dataset in two steps. In the first step, an invisible watermark is embedded into the dataset, followed by a visible watermark. The second watermark can be removed using a secret key that is shared by buyers.

In a publication entitled "*Watermarking Images In Self-Supervised Latent Spaces*", authored by Pierre Fernandez et al., published in March 2022, there is provided a watermarking algorithm that can embed both marks and binary messages in the latent spaces of different pre-trained networks.

However, embedding watermarking messages can be detrimental to the digital asset. For example, long watermarking messages can distort the content of the data.

SUMMARY

Developers have devised methods and devices for overcoming at least some drawbacks present in prior art solutions.

Developers of the present technology have realized that the imperceptibility feature of the watermarking can limit the amount of information that can be embedded into a data sample from a dataset. For example, when the embedded message gets longer, watermarking a longer message would distort content of the data, increase errors in extracted messages, and/or reduce robustness of watermarking against possible attacks.

Developers of the present technology have realized that a size capacity of a watermarking technique may also depend on the data type. Data types that have higher redundancies, have more room for embedding longer messages. As a result, a message's possible length varies based on inter alia the data type and target application of the watermarking technique.

Developers of the present technology have realized that some existing watermarking solutions try to avoid noticeable distortions in samples of the watermarked dataset, but these watermarking methods suffer from low capacity which limits their application for embedding long messages.

Developers of the present technology have realized that embedding longer messages into the data increases the chance of error in the extracted watermark. In addition, when the embedded watermark is longer, potential attacks on the watermarked data samples can increase the error rate in the extracted messages.

In at least some embodiments of the present technology, developers have devised a dataset watermarking framework comprising three main components, namely: (i) message encoding, (ii) data watermarking, and (iii) message decoding.

In some embodiments of the present technology, a message encoder encodes an "original" watermark message into multiple, and comparatively shorter, "sub-messages". The encoded sub-messages are then embedded into data samples of a dataset using a data watermarking technique.

It should be noted that embedding sub-messages instead of the original watermark message may achieve bit reduction of watermark data embedded into the digital dataset, while retaining the ability to later reconstruct the original watermark data.

It is contemplated that a variety of watermarking techniques may be used for embedding the sub-messages into data samples, instead of the original watermark message. For example, the watermarking technique may depend on inter alia a data type of the data sample and/or of the original watermark message.

In some embodiments, there is provided a dataset watermarking system configured to perform text-based watermarking. A text-based watermarking system is configured to perform a strategic insertion of digital watermarks within textual datasets, such as text documents, web pages, and social media posts, for example. Text-based watermarking techniques generate a watermark data sample through specific textual modifications, such as character substitutions, word reordering, and/or intelligent synonym replacement. Specialized algorithms and techniques can detect such embedded data, providing data owners with the means to trace the source of leaked and/or misused textual data.

In some embodiments, there is provided a dataset watermarking system configured to perform audio data watermarking. An audio data watermarking system is configured to perform embedding of imperceptible watermarks into audio datasets, including speech recordings, music tracks, and environmental sounds, for example. Audio watermarking techniques generate a watermarked data sample via adjustments in the frequency domain and/or time domain, while attempting to minimize degradation of audio quality. The embedded audio watermarks allow for tracing the origin of leaked and/or pirated audio content, for example.

In some embodiments, there is provided a dataset watermarking system configured to perform video data watermarking. A video data watermarking system is configured to perform embedding of hidden watermarks into video datasets, comprising video clips, movies, and surveillance footage, for example. Video watermarking techniques generate a watermark data sample via specific frame modifications, spatial domain alterations, and/or temporal manipulation. The embedded video watermarks may enable content owners to assert ownership, deter unauthorized distribution, and/or track the unauthorized use of video data.

Developers of the present technology have also devised a watermark extraction system configured to generate the set of extracted/test sub-messages. The watermark extraction system includes a decoder to obtain a decoded watermark message using the set of extracted/test sub-messages. Developers of the present technology have realized a benefit of proposing a watermarking system which is configured to encode a long message into shorter messages, and reconstruct the long message from the shorter messages.

It is contemplated that message encoding procedures can be optimized according to one or more constraints such as robustness against subset attacks.

In some embodiments, the message encoder can be employed in combination with known watermarking techniques, in a "plug-and-play" manner, —i.e., where the watermarking technique receives commands to embed the shorter sub-messages instead of the longer original messages. In other words, the message encoder may generate the shorter messages based on an original long message and then fed them to a known watermarking solution. The system may then employ the watermarking solution on the so-generated short sub-messages to perform watermarking, without necessarily modifying the underlying watermarking technique.

In some embodiments of the present technology, at least one of the message encoder and the message decoder may be implemented as a Neural Network (NN). It is contemplated that at least one of the message encoder and the message decoder may be implemented as a pre-trained model, such as a NN that has been trained on a large dataset to perform a task.

In some embodiments of the present technology, it is contemplated that a dataset to be watermarked may include a single digital object. In other embodiments, it is contemplated that a dataset to be watermarked may include a plurality of portions of a single digital object. For example, the dataset to be watermarked may be an image dataset and which includes respective sub-portions of a single image object and which sub-portions are to be watermarked.

In a first board aspect of the present technology, there is provided a computer-implemented method for watermarking objects of a digital dataset, the method executable by one or more processors, the method comprising, at a first moment in time, acquiring a watermark message of a first size and generating a plurality of sub-messages based on the watermark message, the plurality of sub-messages being indicative of encoded portions of the watermark message. Each of the plurality of sub-messages being different from the watermark message and having a second size, the second size being smaller than the first size. The method also includes generating a watermarked object by embedding a given object from the digital dataset with a given one of the plurality of sub-messages, in lieu of the watermark message.

In some implementations, the method further includes, at a second moment in time after the first moment in time, acquiring a test watermarked digital dataset including a given test watermarked object, extracting a test sub-message from the given test watermarked object, the test sub-message having the second size, generating a decoded watermark message using the test sub-message, the decoded watermark message being different from the test sub-message and having the first size and determining whether the decoded watermark message matches the watermark message.

In some implementations, the given object is at least one of a text-based object, an audio object, and a video object.

In some implementations, the watermark message includes at least one of textual data, audio data, and video data.

In some implementations, the generating the plurality of sub-messages is executed by employing a pre-trained Neural Network (NN) model.

In some implementations, the generating the plurality of sub-messages includes generating a plurality of codewords using the watermark message, generating a first sub-message from the plurality of sub-messages using a combination of codewords from the plurality of codewords. The first sub-message includes a body portion with the combination of codewords, and an indexing portion being unique for combination of codewords amongst other possible combinations of codewords from the plurality of codewords.

In some implementations, the generating the plurality of sub-messages includes generating a second sub-message from the plurality of sub-messages using a second combination of codewords from the plurality of codewords, the second combination of codewords being different from the combination of codewords. The first sub-message includes a second body portion with the second combination of codewords, and a second indexing portion being unique for second combination of codewords amongst other possible combinations of codewords from the plurality of codewords. The method also includes generating a second watermarked object by embedding a second given object from the plurality of objects with the second sub-message, in lieu of the watermark message.

In a second aspect of the present technology, there is provided a method of processing a watermarked digital dataset, the method executable by one or more processors, the method comprises acquiring a test watermarked digital dataset including a given test watermarked object, extracting a test sub-message from the given test watermarked object, the test sub-message having a second size, generating a decoded watermark message using the test sub-message, the decoded watermark message being different from the test sub-message and having a first size, the first size being bigger than the second size and determining whether the decoded watermark message matches a stored watermark message.

In some implementations, the method further comprises extracting a second test sub-message from a second test watermarked object from the test watermarked digital dataset and wherein the generating the decoded watermark message further includes using the second test sub-message.

In a third broad aspect of the present technology, there is provided a system for watermarking objects of a digital dataset, the system comprising a controller and a memory storing a plurality of executable instructions which, when executed by the controller, cause the system to, at a first moment in time, acquire a watermark message of a first size and generate a plurality of sub-messages based on the watermark message, the plurality of sub-messages being indicative of encoded portions of the watermark message. Each of the plurality of sub-messages being different from the watermark message and having a second size, the second size being smaller than the first size. The system also generates a watermarked object by embedding a given object from the digital dataset with a given one of the plurality of sub-messages, in lieu of the watermark message.

In some implementations, the system further acquire, at a second moment in time after the first moment in time, a test watermarked digital dataset including a given test watermarked object, extract a test sub-message from the given test watermarked object, the test sub-message having the second size, generate a decoded watermark message using the test sub-message, the decoded watermark message being different from the test sub-message and having the first size and determining whether the decoded watermark message matches the watermark message.

In some implementations, the given object is at least one of a text-based object, an audio object, and a video object.

In some implementations, the watermark message includes at least one of textual data, audio data, and video data.

In some implementations, the generating the plurality of sub-messages is executed by employing a pre-trained Neural Network (NN) model.

In some implementations, the system generates the plurality of sub-messages by generating a plurality of codewords using the watermark message, generating a first sub-message from the plurality of sub-messages using a combination of codewords from the plurality of codewords. The first sub-message includes a body portion with the combination of codewords, and an indexing portion being unique for combination of codewords amongst other possible combinations of codewords from the plurality of codewords.

In some implementations, the system is configured to generate the plurality of sub-messages by generating a second sub-message from the plurality of sub-messages using a second combination of codewords from the plurality of codewords, the second combination of codewords being different from the combination of codewords. The first sub-message includes a second body portion with the second combination of codewords, and a second indexing portion being unique for second combination of codewords amongst other possible combinations of codewords from the plurality of codewords. The system also generates a second watermarked object by embedding a second given object from the plurality of objects with the second sub-message, in lieu of the watermark message.

In a fourth aspect of the present technology, there is provided a system for processing a watermarked digital dataset, the system comprising a controller and a memory storing a plurality of executable instructions which, when executed by the controller, cause the system to acquire a test watermarked digital dataset including a given test watermarked object, extract a test sub-message from the given test watermarked object, the test sub-message having a second size, generate a decoded watermark message using the test sub-message, the decoded watermark message being different from the test sub-message and having a first size, the first size being bigger than the second size and determine whether the decoded watermark message matches a stored watermark message.

In some implementations, the system is configured to extract a second test sub-message from a second test watermarked object from the test watermarked digital dataset and generate the decoded watermark message further using the second test sub-message.

In the context of the present technology, a generative model is a type of model in deep learning that learns patterns in the training set and generates new samples based on the learned patterns.

In the context of the present technology, a subset attack refers to a situation where the attacker may release only a subset of watermarked samples to damage the embedded watermark.

In the context of the present technology, the term "secret sharing" refers to ways for sharing a secret among a group in such a way that no entity has any useful knowledge about the secret, but when a sufficient number of individuals combine their "shares", the secret can be reconstructed.

In the context of the present technology, attacks against watermarking are malicious attacks on watermarked data which change data such that it may seem unchanged to a human but cause error in the extracted message from watermarked data.

In the context of the present technology, an adversary is an entity whose aim is to prevent the users of a system from achieving their goal. In the context of watermarking, an adversary is assumed to attempt to cause errors in the message extracted from watermarked data.

In the context of the present technology, majority voting refers to a process where the collective prediction for a variable is decided by a majority of the votes of the values for that variable.

In the context of the present specification, a "server" is a computer program that is running on appropriate hardware and is capable of receiving requests (e.g., from devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "device" is any computer hardware that is capable of running software appropriate to the relevant task at hand. Thus, some (non-limiting) examples of devices include personal computers (desktops, laptops, netbooks, etc.), smartphones, and tablets, as well as network equipment such as routers, switches, and gateways. It should be noted that a device acting as a device in the present context is not precluded from acting as a server to other devices. The use of the expression "a device" does not preclude multiple devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers. It can be said that a database is a logically ordered collection of structured data kept electronically in a computer system.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
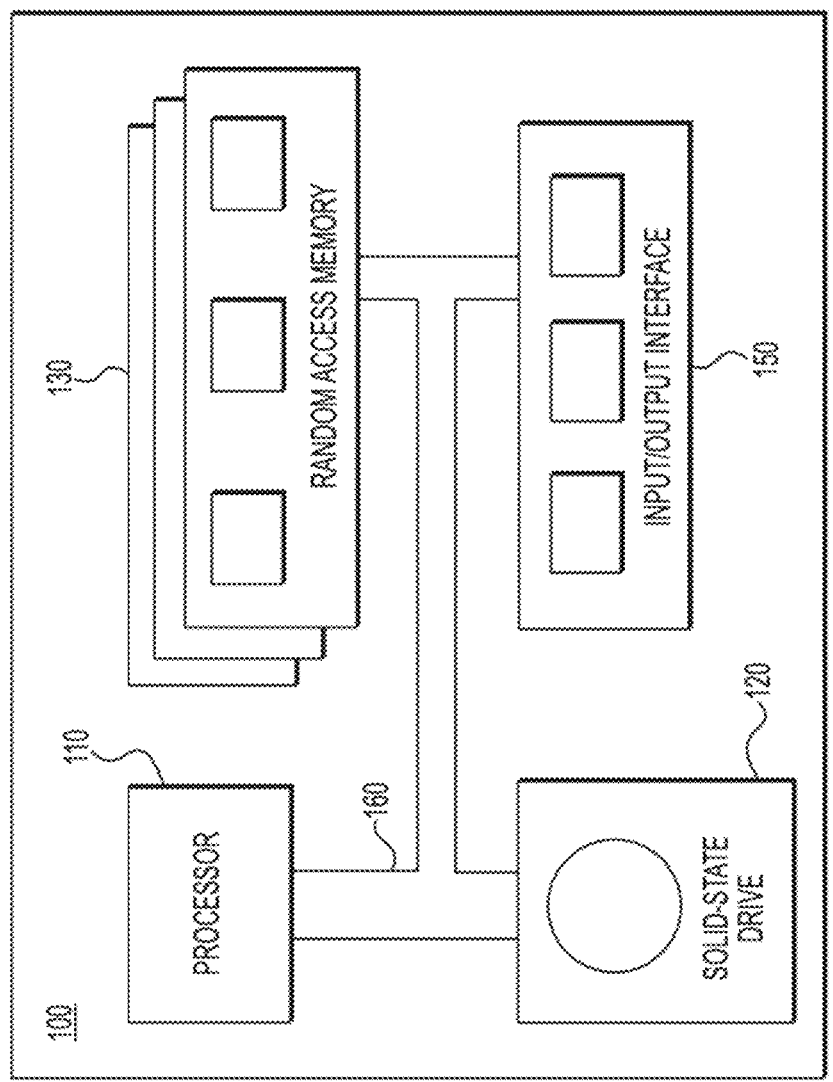
FIG. 1 illustrates an example of a computing device that may be used to implement any of the methods described herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

FIG. 1 illustrates a diagram of a computing environment 100 in accordance with an embodiment of the present technology is shown. In some embodiments, the computing environment 100 may be implemented by any of a conventional personal computer, a computer dedicated to operating and/or monitoring systems relating to a data center, a controller and/or an electronic device (such as, but not limited to, a mobile device, a tablet device, a server, a controller unit, a control device, a monitoring device etc.) and/or any combination thereof appropriate to the relevant task at hand. In some embodiments, the computing environment 100 comprises various hardware components including one or more single or multi-core processors collectively represented by a processor 110, a solid-state drive 120, a random access memory 130 and an input/output interface 150.

In some embodiments, the computing environment 100 may also be a sub-system of one of the above-listed systems. In some other embodiments, the computing environment 100 may be an "off the shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wire or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the random access memory 130 and executed by the processor 110 for executing operating data centers based on a generated machine learning pipeline. For example, the program instructions may be part of a library or an application.

In some embodiments of the present technology, the computing environment 100 may be implemented as part of a cloud computing environment. Broadly, a cloud computing environment is a type of computing that relies on a network of remote servers hosted on the internet, for example, to store, manage, and process data, rather than a local server or personal computer. This type of computing allows users to access data and applications from remote locations, and provides a scalable, flexible, and cost-effective solution for data storage and computing. Cloud computing environments can be divided into three main categories: Infrastructure as a Service (IaaS), Platform as a Service (PaaS), and Software as a Service (SaaS). In an IaaS environment, users can rent virtual servers, storage, and other computing resources from a third-party provider, for example. In a PaaS environment, users have access to a platform for developing, running, and managing applications without having to manage the underlying infrastructure. In a SaaS environment, users can access pre-built software applications that are hosted by a third-party provider, for example. In summary, cloud computing environments offer a range of benefits, including cost savings, scalability, increased agility, and the ability to quickly deploy and manage applications.

In the context of the present technology, the computing device 100 and/or processor 110 may be configured to watermark a dataset and/or to extract a watermark from a test dataset. Broadly, the processor 110 may be part of a dataset watermarking system and is configured to execute one or more computer-implemented methods designed to ameliorate conventional dataset watermarking techniques.

Dataset watermarking can enable secure and robust embedding of imperceptible watermarks into datasets, facilitating data ownership verification, intellectual property protection, and provenance tracking. One or more methods described herein can be applied to diverse types of datasets, including text data, audio data, and video data, for example, and may be used for ensuring data integrity and/or traceability across multiple domains and applications.

A dataset watermarking system as envisioned in some embodiments of the present technology may be configured to execute various watermarking techniques tailored to different data types, including: text data, audio data, video data, and the like. In accordance with a given watermarking technique, the processor 110 is configured to embed digital messages into objects from a dataset using inter alia imperceptible modifications, while attempting to minimize an impact on the original data and to ensure high robustness to removal and/or alteration attempts.

In some embodiments, the dataset watermarking system may be configured to perform text data watermarking. A text-based watermarking system is configured to perform a strategic insertion of digital watermarks within textual datasets, such as text documents, web pages, and social media posts, for example. The watermarking technique may generate a watermarked data sample through subtle textual modifications, such as character substitutions, word reordering, or intelligent synonym replacement.

In some embodiments, the dataset watermarking system may be configured to perform audio data watermarking. An audio data watermarking system is configured to perform embedding of imperceptible watermarks into audio datasets, including speech recordings, music tracks, and environmental sounds, for example. Audio watermarking technique generates a watermarked data sample via adjustments in the frequency domain and/or the time domain, while attempting to minimize degradation of audio quality.

In some embodiments, the dataset watermarking system may be configured to perform video data watermarking. A video data watermarking system is configured to perform embedding of hidden watermarks into video datasets, comprising video clips, movies, and surveillance footage, for example. Video watermarking technique can generate a watermark data sample via specific frame modifications, spatial domain alterations, and/or temporal manipulation.

As it will be described in more details herein further below, in at least some embodiments of the present technology, there is provided systems, processors, and methods for a dataset watermarking solution where the embedded messages in the data samples are shorter compared to the original message. Also, in at least some embodiments of the present technology, there is provided a method of encoding a message into multiple shorter messages such that the original message can be reconstructed when a subset of shorter sub-messages is available.

Figure 2:
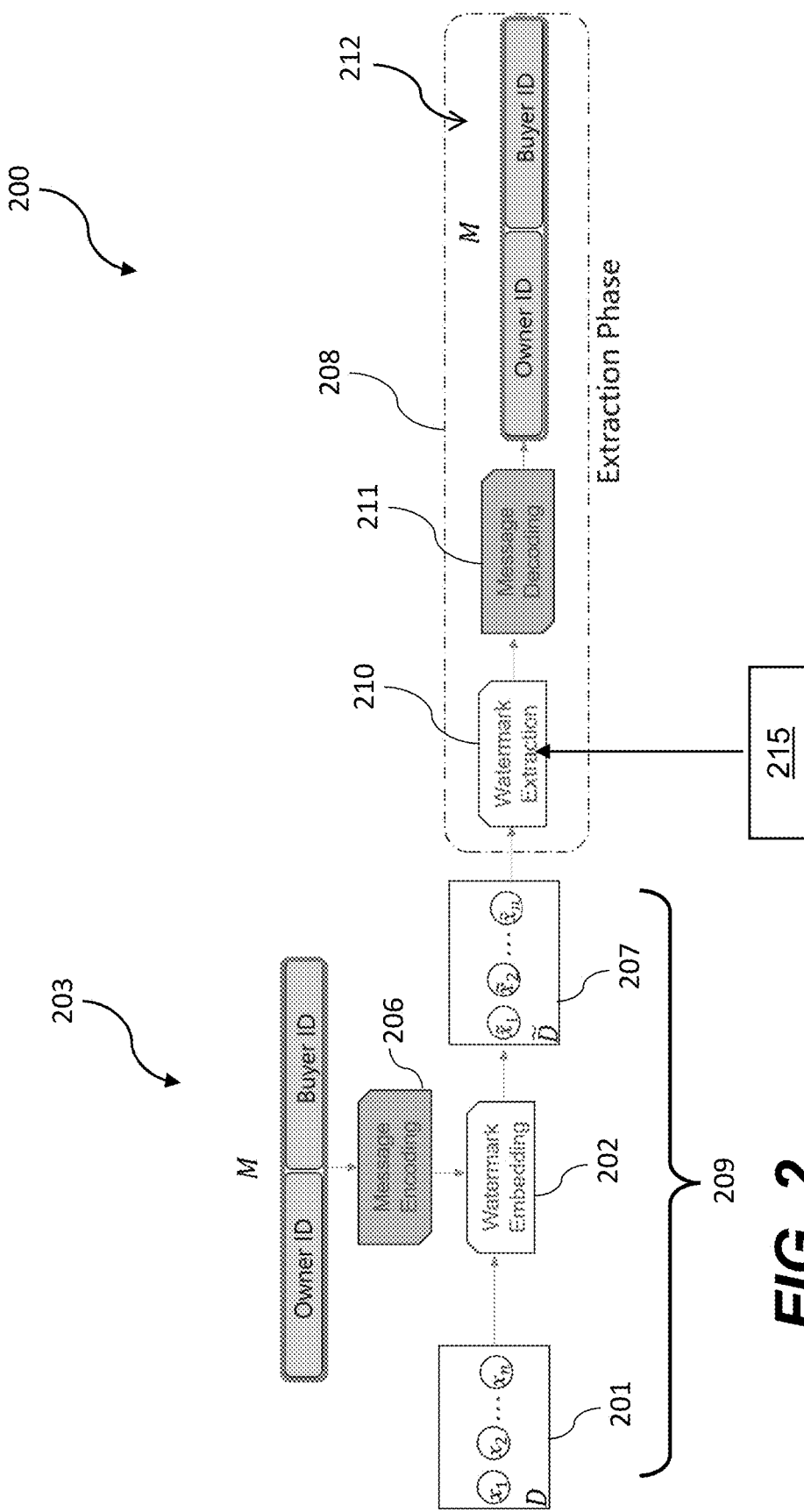
FIG. 2 illustrates a watermarking framework with a watermarking stage and an extraction phase executed by the computing device of FIG. 1, in accordance with at least some embodiments of the present technology.

With reference to FIG. 2, there is depicted a watermarking framework 200 executable by the computing device 100, in accordance with at least some embodiments of the present technology. It is contemplated that the watermarking framework 200 may be implemented by other computer systems that are configured to perform dataset watermarking, without departing from the scope of the present technology.

Broadly, the watermarking framework 200 comprises a watermarking stage 209, and an extraction phase 208. It should be noted that the watermarking stage 209 and the extraction phase 208 may be performed by the same processor(s) and/or different processors(s) respectively. Also, the watermarking stage 209 and the extraction stage 208 do not necessarily need to be performed immediately sequentially in time. In other words, at a first moment in time, the processor 110 may be configured to execute the watermarking stage 209, and at a second moment in time, the processor 110 may be configured to execute the extraction stage 209. For example, at the first moment in time the processor 110 may be configured to generate watermark datasets, and at the second moment in time the processor 110 may be configured to determine whether acquired data carries information indicative of the watermarked data.

Let $D=\{x_i\}_{i=1}^n$ be an original dataset 201 where $x_i$ is a data sample from D. The processor 110 may be configured to "watermark" the dataset 201 by embedding information about the original message 203 M into D. In this example, M is a message with information used to identify an owner of the dataset 201, and a consumer or licensee of the dataset 201. However, other information of interest may be included as part of a message to be watermarked into the dataset 201.

A watermarked dataset 207 is denoted by $\tilde{D}=\{\tilde{x}_i\}_{i=1}^n$ where $\tilde{x}_i$ is a sample in the watermarked dataset 207. In this example, the processor 110 is configured to watermark all the samples of D. It is contemplated that the processor 110 may embed watermark data into only a subset of the data samples of the dataset 201, without departing from the scope of the present technology.

Developers have realized that some dataset watermarking techniques aim to minimize distortion of data content when embedding a message into respective data samples. Therefore, the size capacity of information to be embedded into the dataset may be limited, and/or embedding a large message into a data sample may be detrimental and/or prohibitive for a given distortion budget. In at least some embodiments of the present technology, developers have devised methods, systems and processors to overcome a limited size capacity problem, where the message 203 is encoded into a plurality of shorter messages called "sub-messages", and where sub-messages are embedded into the data samples, instead of the message 203 itself.

The processor 110 is then configured to provide the message 203 M to a message encoder 206 $E_M$. In this example, $E_M$ encodes M into a set of shorter sub-messages $\hat{M}$. In this example, $\hat{M}=\{M_i\}_{i=1}^n$ where $M_i$ are the sub-messages to be embedded into the data samples of the dataset 201. The length of each of the sub-messages is shorter if compared to the message 203, i.e., $|M_i|<|M|$. It is contemplated that the sub-messages within the plurality of sub-messages generated by the message encoder 206 may comprise different lengths, without departing from the scope of the present technology.

It should be noted that the message encoder 206 may be embodied as any message encoder that is configured to encode the message 203 into the plurality of sub-messages. In at least one embodiment of the present technology, the processor 110 may be configured to an "adaptive multi-segment message encoding" technique, which will be described in greater details herein further below with reference to FIG. 3.

In this example, the processor 110 is configured to provide the plurality of sub-messages to a watermark embedding module 202. The watermark embedding module 202 is configured to employ a watermarking technique given (i) a data sample and (ii) a sub-message. The watermark embedding module 202 may be configured to employ a variety of watermarking techniques depending on inter alia an input format and/or data type of data samples in the dataset 201, and of the message 203.

For example, if data samples in the dataset 201 are images, an image watermarking method may be employed by the processor 110 for sub-message embedding. Similarly, if data samples in the dataset 201 are video files, a video watermarking method may be employed by the processor 110 for sub-message embedding. It can be said that the processor may be configured to watermark a data sample and output the corresponding watermarked data sample of the watermarked dataset 207. In some embodiments, the processor 110 may watermark multiple data samples at the same time. In other embodiments, the processor 110 may be configured to watermark more than one data sample from the dataset 201 with a same sub-message.

In some embodiments, the processor 110 may be configured to generate the watermarked dataset 207 and store it in memory for further use. For example, the watermarked dataset 207 may be traded, sold, and/or licensed to a different entity to an entity operating the processor 110.

It should be noted that data samples in the watermarked dataset 207 may comprise information for identifying the entity operating the processor 110 and/or a customer entity. Hence, if the watermarked dataset is leaked, or it is re-sold/re-distributed illegally, for example, the embedded information can be employed by the processor 110, and/or an other processor of the watermarking system as envisioned in some embodiments of the present technology, to extract and identify the entity operating the processor 110 and/or the customer entity.

As such, during the extraction stage 208, a targeted dataset 215 is provided by the processor 110 to a watermark extraction module 210. The watermark extraction module 210 is configured to extract embedded information from data samples in the targeted dataset 215. In some embodiments, it is contemplated that the target dataset 215 may comprise only a subset of the watermarked dataset 207.

The processor 110 is configured to perform a decoding procedure on the embedded sub-messages to "reconstruct" the 203 from the extracted sub-messages. In this example, the extracted data is provided by the processor 110 to a message decoder 211 $D_M$ to reconstruct M from the extracted sub-messages $M_i$.

In one example, let it be assumed that the dataset 201 comprises one hundred data samples in a form of images. The processor 110 may be configured to watermark an image dataset. The original message M to be embedded into the dataset is generated the processor 110 using the ID number of the dataset owner and the dataset consumer in the marketplace. For instance, M can be a 200-bit message including a 100-bit ID of the dataset owner and 100-bit ID of the dataset consumer. The original message M is encoded using $E_M$ to obtain one hundred sub-messages $M_i$ where each of the one hundred sub-messages has a length shorter in comparison to the length of the original message M. Each sub-message may be embedded into one of the data samples in the dataset 201.

The watermarking method used in the previous example may be based on Self-Supervised Learning (SSL) watermarking. Broadly, SSL watermarking is a process where self-supervised learning tasks are generated to train a machine learning model to learn meaningful representations of data while also embedding watermarks within the dataset. By employing data augmentation techniques and leveraging the inherent structure of the data, SSL watermarking aims at reducing distortion, preventing unauthorized access and manipulation.

It can be said that SSL watermarking is a deep learning-based method where a watermarked sample is created to satisfy two objectives. The first objective is that distortion due to the watermarking should be minimized. The distortion is defined as Mean Squared Error (MSE):

$$e_d = \frac{\|\tilde{x}_i - x_i\|_2^2}{h \times w} \quad (1)$$

where h is the height of an input image, and w is the width of the input image.

The second objective, $e_w$, is related to the correct reconstruction of the embedded sub-message. For the embedded message $M_i=(m_1, m_2, \ldots, m_l) \in \{0,1\}^l$, and a family of carriers $a_1, a_2, \ldots, a_l$ which are used to extract embedded messages. The carries are considered as the secret keys. $e_w$ is defined as hinge loss with $\mu \geq 0$:

$$e_w = \frac{1}{l} \sum_{j=1}^{l} \max\left(0, \mu - (f^T a_j).m_j\right) \quad (2)$$

where $f \in \mathbb{R}^{2048}$ is a feature vector obtained by applying a pretrained model $\varphi$ to the input data (i.e., $f=\varphi(x)$). $\varphi$ is a pretrained Residual Network (ResNet) model.

Broadly, the ResNet architecture addresses a degradation problem encountered in training very deep neural networks by introducing residual connections. These connections enable the construction of substantially deeper networks while mitigating the vanishing gradient issue and enhancing convergence speed. In some embodiments, the ResNet model may comprise a plurality of residual blocks, each containing convolutional layers, activation functions, and skip connections. The skip connections allow the passing of the input signal through the block, and the residual learning is facilitated by the difference between the input and output of the block.

The total objective function in SSL method is defined as:

$$e_t = e_d + \lambda e_w \quad (3)$$

where $\lambda$ is a hyper-parameter to adjust the loss weight ratio. The watermarked data is obtained by a solving an optimization problem that minimizes $e_t$. The process of watermarking a sample is repeated for all $x_i$ and the corresponding sub-message $M_i$ to obtain the watermarked dataset as $\tilde{D}=\{\tilde{x}i\}_{i=1}^{n}$.

In accordance with SSL watermarking technique, the embedded sub-message is extracted from the watermarked data $\tilde{x}_i$ as:

$$\tilde{M}_i = \left[\text{sign}\left(\varphi(\tilde{x}_i)^T a_1\right), \ldots, \text{sign}\left(\varphi(\tilde{x}_i)^T a_l\right)\right] \quad (4)$$

It should be noted that if D is later leaked, the embedded watermark data (sub-message) can be extracted from one or more leaked data samples. Then, the extracted watermark data (sub-messages) $\tilde{M}'=\{\tilde{M}_1, \ldots, \tilde{M}_n\}$ is sent to the message decoder $D_M$. $D_M$ is configured to reconstruct the original watermark message from the provided set of extracted sub-messages.

As it will be described in greater details herein further below, the processor 110 may be configured to access indexed data generated based on the coding logic of the encoder and used by the decoder for reconstructing the original message.

Figure 3:
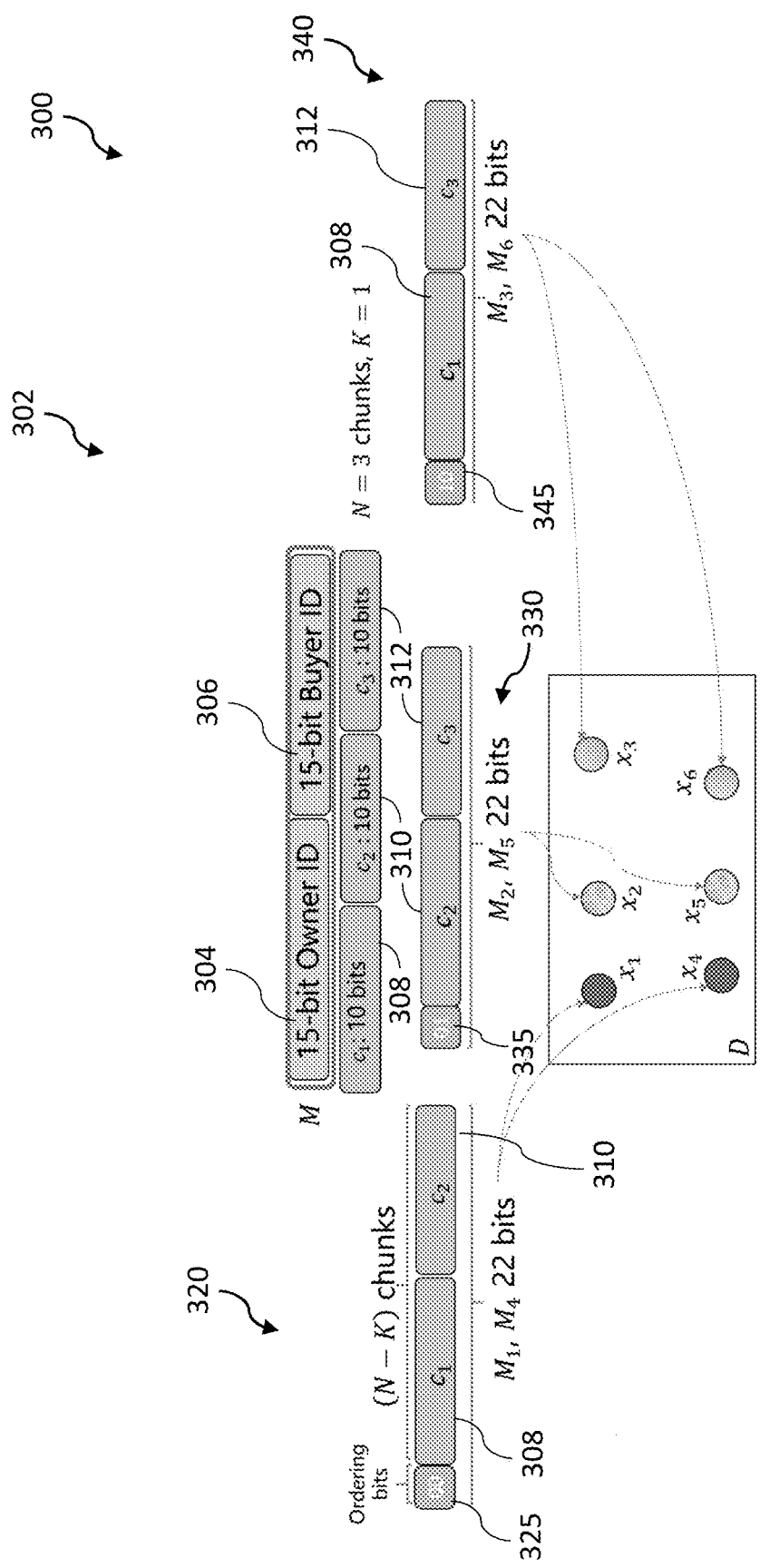
FIG. 3 illustrates a message encoding procedure of the watermarking framework of FIG. 2 executed by the computer device of FIG. 1, in accordance with at least some embodiments of the present technology.

With reference to FIG. 3, there is depicted a message encoding framework 300 as contemplated in at least some embodiments of the present technology. In some embodiments, the message encoder 206 and the message decoding 211 may be implemented in accordance with the message encoding framework 300.

Generally speaking, the message encoder 206 is configured to map a message 302 into a number of shorter sub-messages 320, 330, and 340, and the message decoder 211 is configured to map the encoded sub-messages 320, 330, and 340 back into the message 302.

In some embodiments of the present technology, the message encoder 206 may be configured to generate a plurality of codewords based on the message 302. The message encoder 206 may use different combinations of codewords within the plurality of codewords for generating the encoded sub-messages 320, 330, and 340. As it will become apparent from the description herein further below, the message encoder 206 may also be configured to assign unique index data to a respective combination of codewords.

For example, the processor 110 is configured to split the original message M with length L into N chunks (multiple segments) of same size. For example, the message 302 with information 304 and 306 is split into three chunks 308, 310, and 312. The chunks 308, 310, and 312 (codewords) are denoted as $\{c_i\}_{i=1}^N$.

In some embodiments, if L is not divisible by N, the processor 110 may be configured to pad the message 302 with p zero bits such that L+p is divisible by N. In this example, the processor 110 is configured to generate all the possible combinations of N−K chunks, i.e., C(N, N−K).

The processor 110 is configured to add ordering bits (indexing data) to respective combination of the N−K chunks, which assigns a unique index for that combination of the N−K chunks. For example, ordering bits 325 provide a unique identifier to the first sub-message 320 comprising a combination of the chunk 308 and 310, ordering bits 335 provide a unique identifier to the second sub-message 330 comprising a combination of the chunk 310 and 312, and ordering bits 345 provide a unique identifier to the third sub-message 340 comprising a combination of the chunk 308 and 312.

It can be said that a given combination of chunks and corresponding ordering bits form a respective sub-message generated by the processor 110. N and K are hyperparameters of the message encoder 206 that can be pre-determined by an operator of the processor 110. It can be said that the message encoder 206 operating in accordance with the encoding framework 300 performs an adaptive method in which a length of the encoded messages can be pre-selected and/or dynamically selected in accordance with one or more constraints. For instance, N and K can be selected such that robustness against a subset attack is greater than a given threshold. N and K can also be selected such that the number of possible combinations of chunks is less than the number of samples in a corresponding dataset, without departing from the scope of the present technology.

After the sub-messages 320, 330, and 340 are generated by the processor 110, the processor 110 may be configured to assign the sub-messages 320, 330, and 340 to data samples in the dataset 201. In this example, each data sample in the dataset 206 is assigned with a respective one from the sub-messages 320, 330, and 340. It should be noted that if the number of data samples in the dataset 206 is greater than a number of all the possible combinations, i.e., n>C(N, N−K), then at least some sub-messages can be assigned to multiple data samples.

The message encoder 206 may generate the set of sub-messages $\tilde{M}=\{M_i\}_{i=1}^n$, where each sub-message $M_i$ is to be embedded into $x_i$ by the watermark embedding module 202. In the example of FIG. 3, n=6, L=30, N=3, and K=1.

On the other hand, the message decoder 211 is configured to reconstruct M given a set of the extracted sub-messages $\hat{M}'=\{\tilde{M}_i\}_{i=1}^n$. The message decoder 211 is configured to extract the ordering bits from respective sub-messages of the targeted dataset. In some embodiments, the extracted ordering bits can be used by the processor 110 as an index key for accessing a database. For example, relationship data between unique ordering bits and corresponding combinations of chunks may be stored in the database in a form of a table. The processor 110 is configured to retrieve a corresponding combination of chunks for given ordering bits and arrange said chunks to get $\{c_i\}_{i=1}^N$. In this example, the processor 110 is configured to merge arranged chunks to obtain M.

It is contemplated that if a same chunk is extracted multiple times, the processor 110 may apply majority voting to the extracted chunks to obtain a final chunk bitstream. Developers have realized that majority voting may improve the accuracy of extracted sub-messages when, for example, some of the extracted sub-messages are damaged due to attack and/or extraction errors during the extraction phase.

Figure 4:
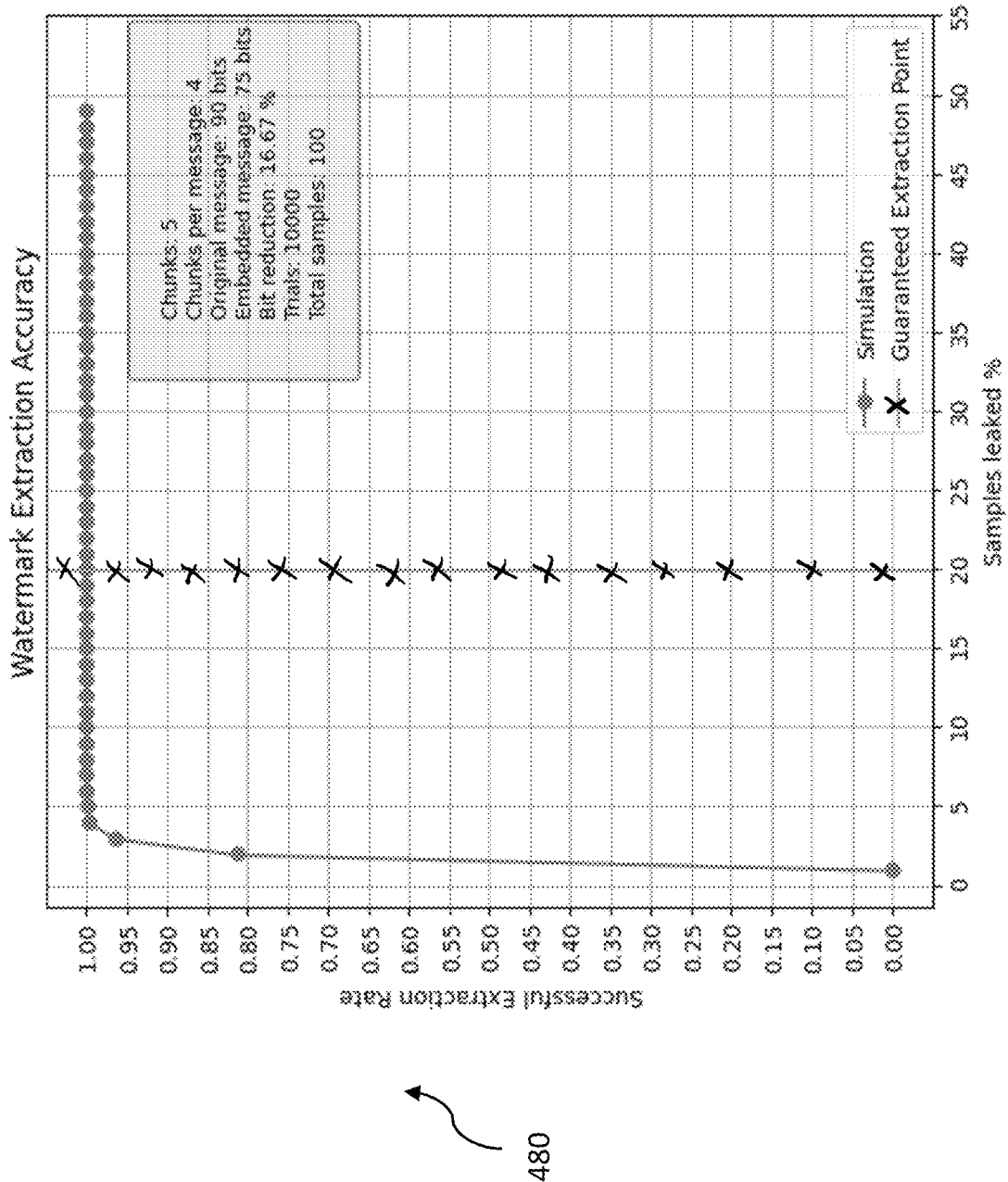
FIG. 4 illustrates experimental results of watermark extraction accuracy during the extraction phase of FIG. 2, in accordance with at least some embodiments of the present technology.

With reference to FIG. 4, there is depicted a graph representation 480 of experimental results of an implementation of the message encoding framework 300. In this implementation, N=5 and K=1 have been selected as hyperparameters, for an original message with a size of 90 bits, and where embedded sub-messages with a size of 75 bits (including ordering bits) are generated via the encoding scheme. Such implementation may achieve a bit reduction of embedded data of 16.67%. Also, 10,000 trial iterations have been performed on a total of 100 objects in the test dataset. Without wishing to be bound to any specific theory, it should be noted that extraction is highly successful for trial iterations after sampling 20% of the objects in the dataset.

Figure 5:
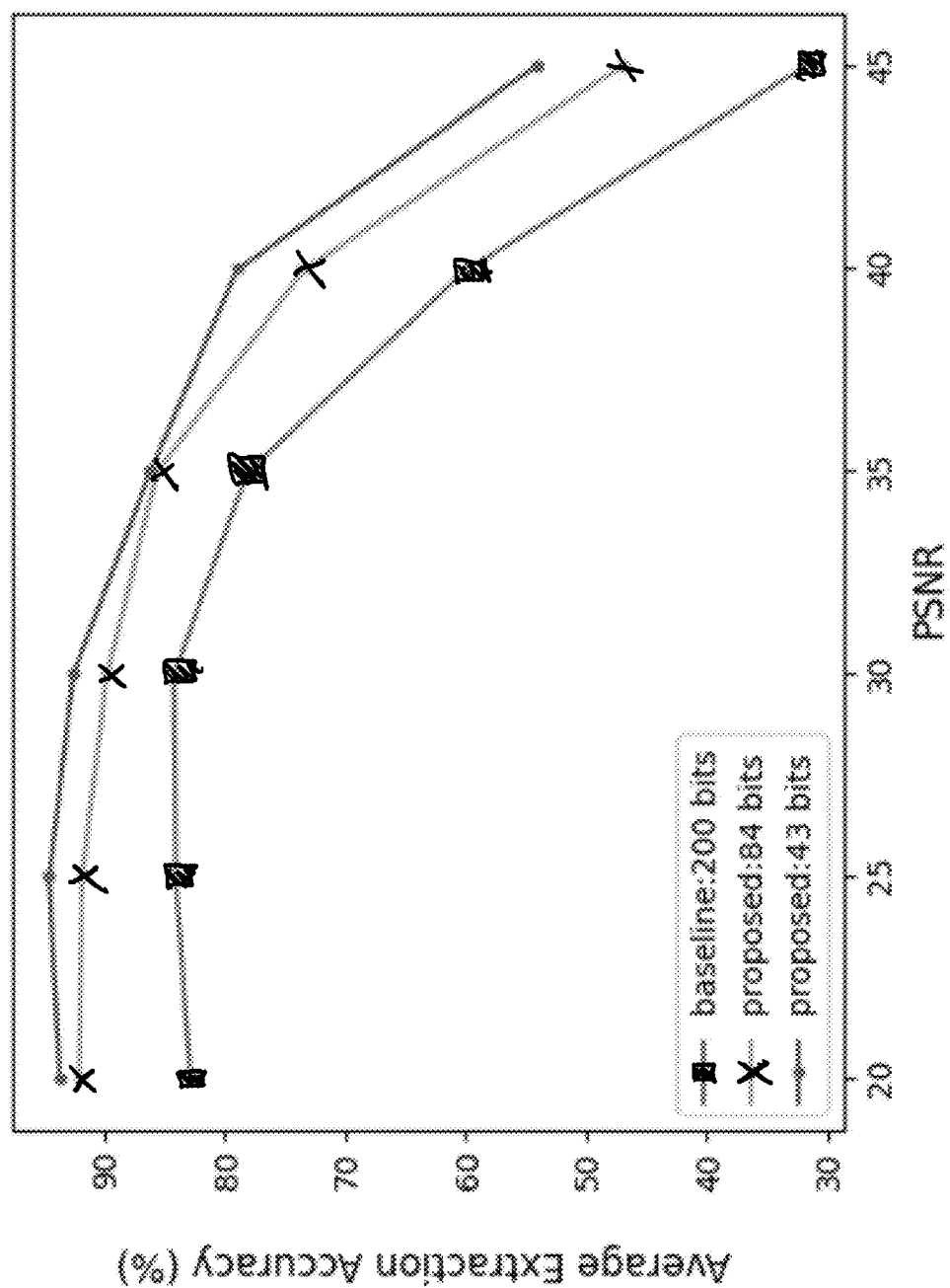
FIG. 5 illustrates experimental results of an average extraction accuracy for different embedded message lengths, in accordance with at least some embodiments of the present technology.

FIG. 5 there is depicted a graph representation 500 of experimental results of an implementation of the message encoding framework 300. The test dataset for watermarks includes 100 images and a random 200-bit original message has been generated for watermarking. The baseline a scenario where the generated 200-bit message is embedded into all the samples in the dataset using SSL technique. On the other hand, in those scenarios where of the message encoding framework 300 has been used, the original message is encoded as shorter sub-messages and shorter sub-messages are embedded into samples of the dataset using the SSL method, instead of the original message. In a first implementation N=5 and K=4 have been used as hyperparameters and in a second implementation N=5 and K=3 have been used as hyperparameters to obtain the encoded messages with length 43 bits and 84 bits, respectively.

After the watermarked samples have been obtained, 49 different adversarial attacks including cropping, resizing, rotating, and adding different noises have been applied to the watermarked samples. The embedded messages are extracted from the attacked samples and passed to a message decoder to reconstruct the original message. A successful extraction corresponds to all bits in the reconstructed message matching those in the original message. Otherwise, it is considered a failure. The Average Extraction Accuracy (AEA) is defined as:

$$AEA = \frac{1}{V}\sum_{i=1}^{V} \mathbb{1}(M_i' == M) \times 100 \qquad (5)$$

where V is the total number of adversarial attacks, $M_i'$ is the reconstructed message obtained from the watermarked dataset after applying the i-th attack, "=="

checks if all the bits match, and A is the indicator function. AEA is obtained for the baseline and the proposed implementations. The experiments are repeated with 10 different original messages (M) and the average AEA over all the messages are shown for different Peak Signal-to-Noise Ratio (PSNR) values. PSNR value is the indicator of the similarity between the watermarked image and the original image and is defined as:

$$PSNR = 10 \log_{10}\left(\frac{255^2}{e_d}\right) \quad (6)$$

where $e_d$ is the MSE defined in equation 1. In these experiments, during the watermarking, all the images are watermarked according to the given PSNR. The higher PSNR means that the watermarked image is not noticeably degraded due to watermarking, whereas lower PSNR means the changes in the image due to watermarking are not insignificant. As it can be seen in FIG. 5, the average extraction accuracy is increased for all the tested PSNR values when the proposed method in this invention is applied. The improvement on the average extraction accuracy can reach over 20% for the highest tested PSNR. The improvements on the extraction accuracy show that the robustness of the dataset watermarking method against adversarial attacks is increased when shorter messages are embedded into each sample of the dataset.

Figure 6:
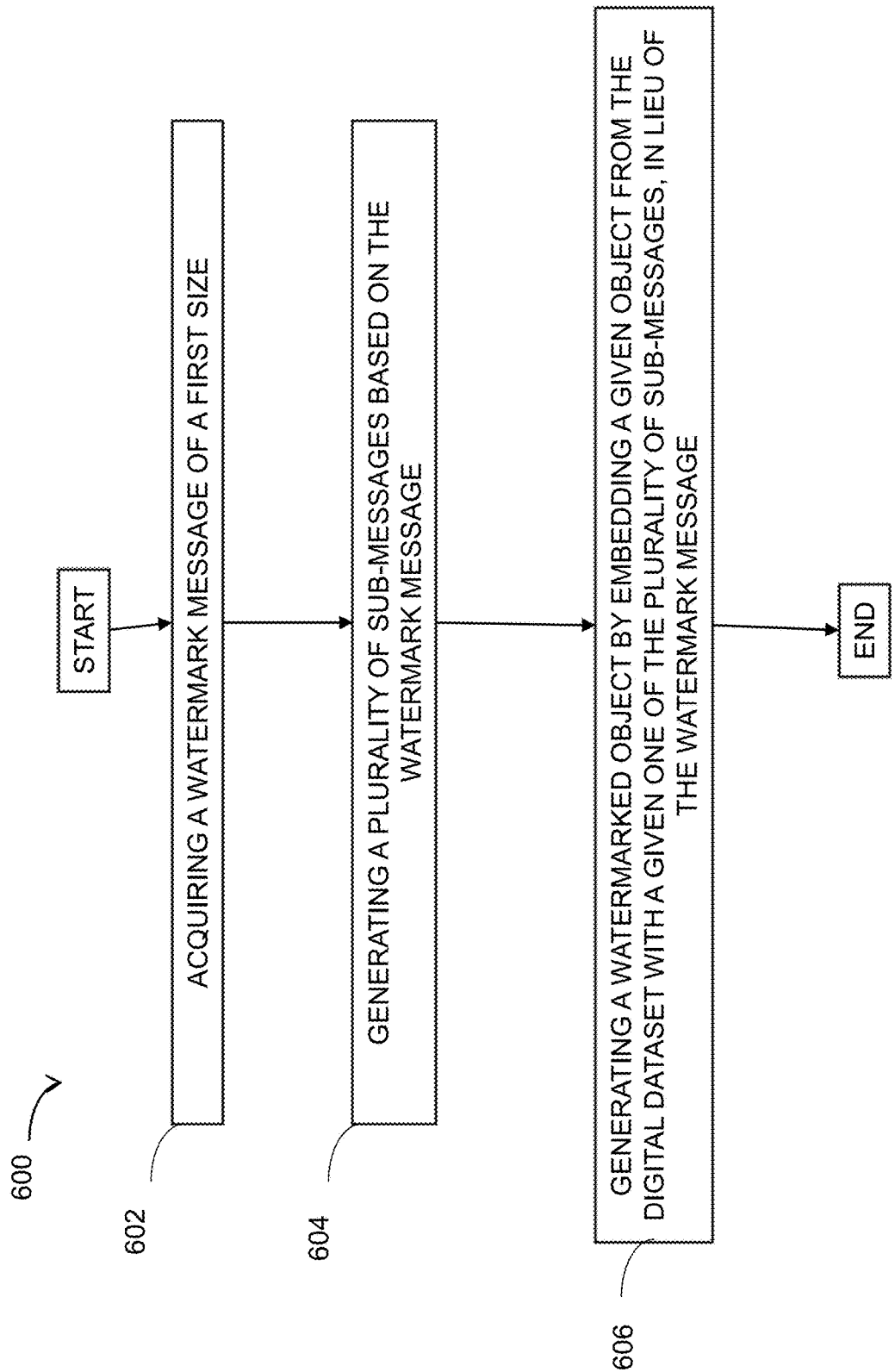
FIG. 6 is a scheme-block illustration of a method executed by a processor of the computing device of FIG. 1, in accordance with at least some non-limiting embodiments of the present technology.

In some embodiments of the present technology, the processor 110 is configured to execute a method 600 for watermarking objects of a digital dataset. In some implementations, the given object is at least one of a text-based object, an audio object, and a video object. A scheme-block illustration of operations of the method 600 is depicted in FIG. 6. It is contemplated that the method 600 can be executed by an electronic device implemented similarly to what has been described above with reference to FIG. 1. In some embodiments, one or more steps of the method 600 may be executed by more than one physical processors. For example, more than one physical processors may be communicatively coupled over a network for performing one or more steps in a distributed manner. It is therefore contemplated that one or more steps from the method 600 may be executed by distinct electronic devices, without departing from the scope of the present technology.

STEP 602: Acquiring a Watermark Message of a First Size

The method 600 starts with acquiring, at operation 602, at a first moment in time, a watermark message of a first size. In some implementations, the watermark message includes at least one of textual data, audio data, and video data. For example, with reference to FIG. 3, the processor 110 may be configured to generate and/or acquire the watermark message 302.

STEP 604: Generating a Plurality of Sub-Messages Based on the Watermark Message

The method 600 continues with generating, at operation 604, a plurality of sub-messages based on the watermark message. The plurality of sub-messages are indicative of encoded portions of the watermark message. Each of the plurality of sub-messages is different from the watermark message and having a second size, the second size being smaller than the first size. In some implementations, the generating the plurality of sub-messages is executed by employing a pre-trained NN model.

For example, with reference to FIG. 3, the processor 110 may be configured to generate sub-messages 320, 330, and 340 based on the watermark message 302.

In the same or other implementations, the generating the plurality of sub-messages includes generating a plurality of codewords using the watermark message and generating a first sub-message from the plurality of sub-messages using a combination of codewords from the plurality of codewords from the plurality of codewords. The first sub-message may include a body portion with the combination of codewords, and an indexing portion being unique for combination of codewords amongst other possible combinations of codewords from the plurality of codewords.

For example, the processor 110 may be configured to generate the sub-message 320 using a combination of the chunk 308 and the chunk 310 (codewords), and by generating an indexing portion including the ordering bits 325.

In some other implementations, the generating the plurality of sub-messages includes generating a second sub-message from the plurality of sub-messages using a second combination of codewords from the plurality of codewords, the second combination of codewords being different from the combination of codewords. The first sub-message may include a second body portion with the second combination of codewords, and a second indexing portion being unique for second combination of codewords amongst other possible combinations of codewords from the plurality of codewords. The method 600 further includes generating a second watermarked object by embedding a second given object from the plurality of objects with the second sub-message, in lieu of the watermark message.

For example, the processor 110 may be configured to generate the sub-message 330 using a combination of the chunk 310 and the chunk 312 (codewords), and by generating an indexing portion including the ordering bits 335.

STEP 606: Generating a Watermarked Object by Embedding a Given Object from the Digital Dataset with a Given One of the Plurality of Sub-Messages, in Lieu of the Watermark Message The method 600 continues with generating, at operation 606, a watermarked object by embedding a given object from the digital dataset with a given one of the plurality of sub-messages, in lieu of the watermark message.

For example, the processor 110 may be configured to embed one or more objects from the digital dataset 201 with the sub-message 320. In another example, the processor 110 may be configured to embed one or more other objects from the digital dataset 201 with the sub-message 330.

In some implementations, the method 600 further includes acquiring, at a second moment in time after the first moment in time, a test watermarked digital dataset including a given test watermarked object. For example, the processor 110 may be configured to acquire the targeted dataset 215 including one or more targeted/test watermarked objects. The method 600 further includes extracting a test sub-message from the given test watermarked object, the test sub-message having the second size and generating a decoded watermark message using the test sub-message, the decoded watermark message being different from the test sub-message and having the first size. For example, the processor 110 may be configured to generate a decoded watermark message 212 that is different from any one of one or more of the sub-messages extracted from the targeted dataset 215. The method 600 further includes determining whether the decoded watermark message matches the watermark message and/or triggering an action based on a comparison between the watermark message and the decoded watermark message.

It is contemplated that a variety of actions may be triggered based on a comparison between the watermark message and the decoded watermark message. In some implementations, the processor 110 may be configured to launch an ownership verification procedure during which, if the extracted watermark matches a stored watermark associated with a given entity, the processor 110 may determine that the test dataset belongs to the given entity. In other implementations, the processor 110 may be configured to launch a data tracing procedure during which, if there are multiple copies of the data with different watermarks, the extracted watermark can be indicative of which version of the dataset is included at least partially in the test dataset. In further implementations, the processor 110 may be configured to launch a leakage identification procedure during which, if the extracted watermark matches a stored watermark associated with a given entity, the extracted watermark can identify which user and/or entity leaked the given watermarked dataset.

While the above-described implementations have been described and shown with reference to particular operations performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

Figure 7:
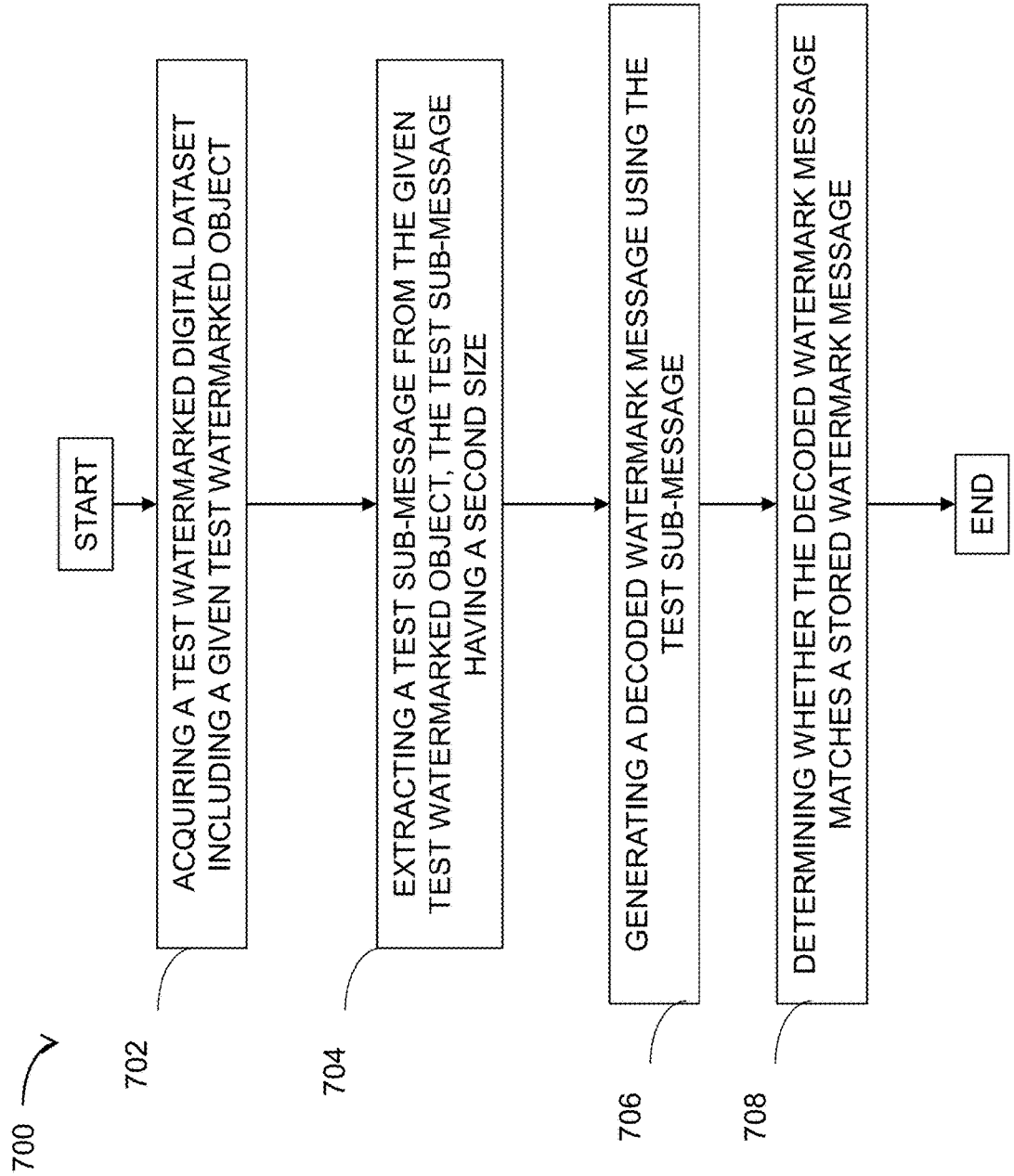
FIG. 7 is a scheme-block illustration of a method executed by a processor of the computing device of FIG. 1, in accordance with at least some non-limiting embodiments of the present technology.

In some embodiments of the present technology, the processor 110 is also configured to execute a method 700 for processing a watermarked digital dataset. In some implementations, the given object is at least one of a text-based object, an audio object, and a video object. A scheme-block illustration of operations of the method 700 is depicted in FIG. 7. It is contemplated that the method 700 can be executed by an electronic device implemented similarly to what has been described above with reference to FIG. 1. In some embodiments, one or more steps of the method 700 may be executed by more than one physical processors. For example, more than one physical processors may be communicatively coupled over a network for performing one or more steps in a distributed manner. It is therefore contemplated that one or more steps from the method 700 may be executed by distinct electronic devices, without departing from the scope of the present technology.

STEP 702: Acquiring a Test Watermarked Digital Dataset Including a Given Test Watermarked Object The method 700 starts with acquiring, at operation 702, a test watermarked digital dataset including a given test watermarked object. For example, with reference to FIG. 2, the processor 110 may be configured to acquire the targeted dataset 215.

STEP 704: Extracting a Test Sub-Message from the Given Test Watermarked Object, the Test Sub-Message Having a Second Size The method 700 continues with extracting, at operation 704, a test sub-message from the given test watermarked object, the test sub-message having a second size. For example, the processor 110 may be configured to extract a test sub-message from a given test object from the targeted dataset 215.

STEP 706: Generating a Decoded Watermark Message Using the Test Sub-Message

The method 700 continues with generating, at operation 706, a decoded watermark message using the test sub-message. The decoded watermark message is different from the test sub-message and having a first size, the first size being bigger than the second size. For example, the processor 110 may be configured to generate the decoded message 212 based on the extracted test sub-message. It is contemplated that more than one test sub-messages may be extracted from more than one test objects from the targeted dataset 215, and the processor 110 may be configured to use the more than one test sub-messages for generating the decoded watermark message 212.

STEP 708: Determining Whether the Decoded Watermark Message Matches a Stored Watermark Message The method 700 continues with determining, at operation 708, whether the decoded watermark message matches a stored watermark message. For example, the processor 110 may be configured to compare the decoded watermark message 212 against the watermark message 203.

In some embodiments, the processor 110 may be configured to retrieve one or more watermark messages stored in a storage and perform comparison(s) against the decoded watermark message 212. It is contemplated that the processor 110 may be configured to determine whether or not the decoded watermark message 212 matches a stored watermark message. The processor 110 may also be configured to trigger a variety of actions depending on inter alia various implementations of the present technology.

While the above-described implementations have been described and shown with reference to particular operations performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for watermarking objects of a digital dataset, the method executable by one or more processors, the method comprising:
    at a first moment in time:
        acquiring a watermark message of a first size;
        generating a plurality of sub-messages based on the watermark message, the plurality of sub-messages being indicative of encoded portions of the watermark message,
            each of the plurality of sub-messages being different from the watermark message and having a second size, the second size being smaller than the first size;
        wherein the generating the plurality of sub-messages includes:
            generating a plurality of codewords using the watermark message; and
            generating a first sub-message from the plurality of sub-messages using a combination of codewords from the plurality of codewords; and
        generating a watermarked object by embedding a given object from the digital dataset with the first sub-message, in lieu of the watermark message.

2. The method of claim 1, wherein the method further comprises:
at a second moment in time after the first moment in time:
acquiring a test watermarked digital dataset including a given test watermarked object;
extracting a test sub-message from the given test watermarked object, the test sub-message having the second size;
generating a decoded watermark message using the test sub-message, the decoded watermark message being different from the test sub-message and having the first size; and
determining whether the decoded watermark message matches the watermark message.

3. The method of claim 1, wherein the given object is at least one of a text-based object, an audio object, and a video object.

4. The method of claim 1, wherein the watermark message includes at least one of textual data, audio data, and video data.

5. The method of claim 1, wherein the generating the plurality of sub-messages is executed by employing a pre-trained Neural Network (NN) model.

6. The method of claim 1, wherein
the first sub-message including:
a body portion with the combination of codewords, and
an indexing portion being unique for combination of codewords amongst other possible combinations of codewords from the plurality of codewords.

7. The method of claim 6, wherein the generating the plurality of sub-messages includes:
generating a second sub-message from the plurality of sub-messages using a second combination of codewords from the plurality of codewords, the second combination of codewords being different from the combination of codewords, the first sub-message including:
a second body portion with the second combination of codewords, and
a second indexing portion being unique for second combination of codewords amongst other possible combinations of codewords from the plurality of codewords;
generating a second watermarked object by embedding a second given object from the plurality of objects with the second sub-message, in lieu of the watermark message.

8. A method of processing a watermarked digital dataset, the method executable by one or more processors, the method comprising:
at a first moment in time:
acquiring a watermark message of a first size;
generating a plurality of sub-messages based on the watermark message, the plurality of sub-messages being indicative of encoded portions of the watermark message,
each of the plurality of sub-messages being different from the watermark message and having a second size, the second size being smaller than the first size;
wherein the generating the plurality of sub-messages includes:
generating a plurality of codewords using the watermark message;
generating a first sub-message from the plurality of sub-messages using a combination of codewords from the plurality of codewords,
generating a watermarked object by embedding a given object from the digital dataset with the first sub-message, in lieu of the watermark message,
at a second moment in time after the first moment in time:
acquiring a test watermarked digital dataset including a given test watermarked object;
extracting a test sub-message from the given test watermarked object, the test sub-message having the second size;
generating a decoded watermark message using the test sub-message, the decoded watermark message being different from the test sub-message and having the first size, the first size being bigger than the second size; and
determining whether the decoded watermark message matches a stored watermark message.

9. The method of claim 8, wherein the method further comprises extracting a second test sub-message from a second test watermarked object from the test watermarked digital dataset and wherein the generating the decoded watermark message further includes using the second test sub-message.

10. A system for watermarking objects of a digital dataset, the system comprising a controller and a memory storing a plurality of executable instructions which, when executed by the controller, cause the system to:
at a first moment in time:
acquire a watermark message of a first size;
generate a plurality of sub-messages based on the watermark message, the plurality of sub-messages being indicative of encoded portions of the watermark message,
each of the plurality of sub-messages being different from the watermark message and having a second size,
the second size being smaller than the first size;
wherein the system is configured to generate the plurality of sub-messges by:
generating a plurality of codewords using the watermark message; and
generating a first sub-message from the plurality of sub-messages using a combination of codewords from the plurality of codewords;
generate a watermarked object by embedding a given object from the digital dataset with the first sub-message, in lieu of the watermark message.

11. The system of claim 10, further configured to:
at a second moment in time after the first moment in time:
acquire a test watermarked digital dataset including a given test watermarked object;
extract a test sub-message from the given test watermarked object, the test sub-message having the second size;
generate a decoded watermark message using the test sub-message, the decoded watermark message being different from the test sub-message and having the first size; and
determining whether the decoded watermark message matches the watermark message.

12. The system of claim 10, wherein the given object is at least one of a text-based object, an audio object, and a video object.

13. The system of claim 10, wherein the watermark message includes at least one of textual data, audio data, and video data.

14. The system of claim 10, wherein the generating the plurality of sub-messages is executed by employing a pre-trained Neural Network (NN) model.

15. The system of claim 10, wherein the first sub-message including:
   a body portion with the combination of codewords, and
   an indexing portion being unique for combination of codewords amongst other possible combinations of codewords from the plurality of codewords.

16. The system of claim 15, wherein the system is configured to generate the plurality of sub-messages by:
   generating a second sub-message from the plurality of sub-messages using a second combination of codewords from the plurality of codewords, the second combination of codewords being different from the combination of codewords, the first sub-message including:
      a second body portion with the second combination of codewords, and
      a second indexing portion being unique for second combination of codewords amongst other possible combinations of codewords from the plurality of codewords;
   generating a second watermarked object by embedding a second given object from the plurality of objects with the second sub-message, in lieu of the watermark message.

\* \* \* \* \*